United States Patent
Tokuyama et al.

(10) Patent No.: US 11,866,568 B2
(45) Date of Patent: Jan. 9, 2024

(54) COMPONENT FOR TELECOMMUNICATION APPARATUS

(71) Applicant: ASAHI KASEI KABUSHIKI KAISHA, Tokyo (JP)

(72) Inventors: Miki Tokuyama, Tokyo (JP); Masahito Kuramitsu, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/252,532

(22) PCT Filed: Aug. 25, 2021

(86) PCT No.: PCT/JP2021/031202
§ 371 (c)(1),
(2) Date: May 11, 2023

(87) PCT Pub. No.: WO2022/107409
PCT Pub. Date: May 27, 2022

(65) Prior Publication Data
US 2023/0391982 A1 Dec. 7, 2023

(30) Foreign Application Priority Data

Nov. 17, 2020 (JP) .................. 2020-191024

(51) Int. Cl.
*C08K 3/22* (2006.01)
*C08L 71/12* (2006.01)
*H01Q 1/36* (2006.01)

(52) U.S. Cl.
CPC ............. *C08K 3/22* (2013.01); *C08L 71/123* (2013.01); *H01Q 1/36* (2013.01); *C08K 2003/2241* (2013.01); *C08L 2205/035* (2013.01)

(58) Field of Classification Search
CPC .. C08L 71/123; C08K 7/08; C08K 2003/2241
See application file for complete search history.

(56) References Cited

U.S. PATENT DOCUMENTS

| 5,760,746 A | 6/1998 | Kawahata |
| 2006/0211800 A1 | 9/2006 | Itakura et al. |
| 2014/0002311 A1 | 1/2014 | Takano et al. |
| 2014/0159963 A1 | 6/2014 | Den et al. |
| 2018/0258282 A1 | 9/2018 | Wang et al. |
| 2020/0194868 A1 | 6/2020 | Maruyama et al. |

FOREIGN PATENT DOCUMENTS

| JP | S50143076 A | 11/1975 |
| JP | H06287018 A | 10/1994 |
| JP | H0998015 A | 4/1997 |
| JP | H1045936 A | 2/1998 |
| JP | 2992667 B2 | 12/1999 |
| JP | 2004196974 A | 7/2004 |
| JP | 2006206689 A | 8/2006 |
| JP | 3930814 B2 | 6/2007 |
| JP | 2010024326 A | 2/2010 |
| JP | 2011116870 A | 6/2011 |
| JP | 5187042 B2 | 4/2013 |
| JP | 2013144767 A | 7/2013 |
| JP | 2018016754 A | 2/2018 |
| WO | 2013005584 A1 | 1/2013 |
| WO | 2018142626 A1 | 8/2018 |

OTHER PUBLICATIONS

Machine-generated English-language translation of JP2010024326A to Yutaka.*
May 16, 2023, International Preliminary Report on Patentability issued in the International Patent Application No. PCT/JP2021/031202.
Nov. 2, 2021, Written Opinion of the International Searching Authority issued in the International Patent Application No. PCT/JP2021/031202.
Nov. 2, 2021, International Search Report issued in the International Patent Application No. PCT/JP2021/031202.

* cited by examiner

*Primary Examiner* — Vu A Nguyen
(74) *Attorney, Agent, or Firm* — KENJA IP LAW PC

(57) ABSTRACT

The present disclosure is directed to a component for a telecommunication apparatus, the component comprising a molded product made of a resin composition. The resin composition comprises (a) a matrix resin and (b) titanium dioxide. The (A) matrix resin comprises (A-a) a polyphenylene ether-based resin. The sum of the contents of the (A-a) polyphenylene ether-based resin, and (A-b) a block copolymer containing at least one block mainly composed of an aromatic vinyl monomer unit and at least one block mainly composed of a conjugated diene monomer unit and/or a hydrogenated product of the block copolymer with respect to 100 parts by mass of the (A) matrix resin is 75 parts by mass or more. The average L/D of the (B) titanium dioxide is 1.2 or more and 6.0 or less, and the content of titanium dioxide having an L/D of greater than 7.0 is less than 10%.

11 Claims, No Drawings

COMPONENT FOR TELECOMMUNICATION APPARATUS

TECHNICAL FIELD

The present disclosure relates to a component for a telecommunication apparatus.

BACKGROUND

Polyphenylene ether is used in a wide range of applications because of its excellent mechanical properties and electrical properties, and heat resistance, as well as its excellent dimensional stability. In particular, there has been a need for materials that can provide antenna characteristics in the high-frequency band of 1 GHz or more.

Here, antenna characteristics are made to be exhibited when a material which contains a matrix resin containing polyphenylene ether and titanium dioxide and has heat resistance, and which allows for formation of circuits by application of a conductive ink, etc. is used for components for a telecommunication apparatus. This technology makes it possible to provide a component for a telecommunication apparatus which enables control on the dielectric constant, has a low dielectric dissipation factor, and on which circuits, wiring, and bases are formed from a metal. Furthermore, because circuits, wiring, and bases can be formed thereon, such a material can be used as a metal substitute for a component for a telecommunication apparatus.

In the meantime, surface-mounted dielectric antennas for mobile communication devices such as cellular phones and wireless LAN devices have been proposed which are made of a dielectric ceramic alone, a resin alone, or a resin composition containing ceramics. For example, a surface-mounted dielectric antenna in which the antenna base is made of a ceramic alone or a resin alone (see PTL 1), and a foam made of a styrene-based resin having a syndiotactic structure with the real part of the relative permittivity of about 18 and having good platability and a manufacturing method thereof (see PTL 2) are disclosed. Furthermore, a resin composition in which spherical dielectric ceramic powders are mixed with a resin material at a ratio of vol % to 70 vol % (% by volume) in a composition (see PTL 3), and a composite material in which titanic acid metal salt fibers an aspect of which is adjusted to a ratio of 3 to 5 to obtain high filling is composited with a thermoplastic resin, etc. (see PTL 4) are disclosed.

Furthermore, a technology is known in which the dielectric constant is increased by controlling an aspect ratio of titanium dioxide after melt kneading in a composition containing a matrix resin containing polyphenylene ether and titanium dioxide (see PTL 5).

CITATION LIST

Patent Literature

PTL 1: JP H09-98015 A
PTL 2: JP H10-45936 A
PTL 3: JP 3930814 B
PTL 4: JP 2992667 B
PTL 5: JP 5187042 B

SUMMARY

Technical Problem

In recent years, with reductions in the weights and the sizes of cell phones and other mobile communication devices, there has been a growing demand for lighter and smaller dielectric antennas. Although antennas can be made smaller by using titanium dioxide with a high dielectric constant, titanium dioxide in spherical shapes is required to be filled with a high density in order to increase the dielectric constant, which reduces the flowability of the resin and makes it difficult to use in components having complex shapes. In addition, as disclosed in PTL 5, the dielectric constant can be increased by using titanium dioxide with a large aspect ratio, but the dielectric dissipation factor also increases at the same time, making it difficult to improve the antenna performances. Furthermore, for use in communication devices, e.g., as antennas, there is a need for materials on which circuits, wiring, and bases can be formed from a metal.

Therefore, an object of the present disclosure is to provide a component for a telecommunication apparatus which allows for control on the dielectric constant while maintaining the dielectric dissipation factor low, and on which circuits, wiring, and bases can be formed from a metal.

Solution to Problem

As a result of diligent study to solve the above-mentioned problem, the present inventors have discovered that the dielectric constant can be controlled by controlling the composition of a composition containing (A) a matrix resin and (B) titanium dioxide to a specific range, circuits, wiring, and bases can be formed from a metal by providing a material with high heat resistance while maintaining the dielectric dissipation factor low, and it is possible to produce a molded product that does not crack even when metal circuits are formed, thereby completing the present disclosure.

Specifically, the present disclosure are as follows.

[1]

A component for a telecommunication apparatus, the component comprising a molded product made of a resin composition, wherein the resin composition comprises (a) a matrix resin and (b) titanium dioxide, the (A) matrix resin comprises (A-a) a polyphenylene ether-based resin, a sum of contents of the (A-a) polyphenylene ether-based resin, and (A-b) a block copolymer containing at least one block mainly composed of an aromatic vinyl monomer unit and at least one block mainly composed of a conjugated diene monomer unit and/or a hydrogenated product of the block copolymer with respect to 100 parts by mass of the (A) matrix resin is 75 parts by mass or more, and an average L/D of the (B) titanium dioxide is 1.2 or more and 6.0 or less, and a content of titanium dioxide having an L/D of greater than 7.0 is less than 10%.

[2]

The component for a telecommunication apparatus according to [1], wherein the resin composition comprises the (A-b) block copolymer containing at least one block mainly composed of an aromatic vinyl monomer unit and at least one block mainly composed of a conjugated diene monomer unit and/or the hydrogenated product of the block copolymer.

[3]

The component for a telecommunication apparatus according to [1] or [2], wherein the resin composition further comprises (A-c) a polystyrene-based resin.

[4]

The component for a telecommunication apparatus according to any one of [1] to [3], wherein 10 parts by mass or more and 90 parts by mass or less of the (B) titanium dioxide is contained with respect to 100 parts by mass of the resin composition.

[5]

The component for a telecommunication apparatus according to any one of [1] to [4], wherein 50 parts by mass or more of the (A-a) polyphenylene ether-based resin is contained with respect to 100 parts by mass of the (A) matrix resin.

[6]

The component for a telecommunication apparatus according to any one of [1] to [5], wherein 10 parts or less of polyamide and polyphenylene sulfide in total are contained with respect to 100 parts by mass of the (A) matrix resin.

[7]

The component for a telecommunication apparatus according to any one of [1] to [6], wherein a mass ratio x (% by mass) of inorganic substances with respect to 100% by mass of the resin composition and a dielectric constant y of the resin composition at a measurement frequency of 1 GHz satisfy the relationship: $y > 0.0006x^2 + 0.021x + 2.52$.

[8]

The component for a telecommunication apparatus according to any one of [1] to [76], wherein the molded product is present in a plural and the component has a structure in which the plurality of molded products are mated with each other.

[9]

The component for a telecommunication apparatus according to any one of [1] to [8], wherein a circuit can be formed by application of a copper ink.

The component for a telecommunication apparatus according to any one of [1] to [9], further comprising one or more selected from the group consisting of a metal circuit, metal wiring, and a metal base.

The component for a telecommunication apparatus according to any one of [1] to [10], wherein the component is a component for a high frequency antenna.

Advantageous Effect

According to the present disclosure, it is possible to obtain a component for a telecommunication apparatus which allows for control on the dielectric constant while maintaining the dielectric dissipation factor low, and on which circuits, wiring, and bases can be formed from a metal.

DETAILED DESCRIPTION

The particulars of the present disclosure will be described in detail below.

A component for a telecommunication apparatus of the present embodiment has a molded product made of a resin composition. The resin composition includes (A) a matrix resin and (B) titanium dioxide, wherein the (A) matrix resin includes (A-a) a polyphenylene ether-based resin and, optionally (A-b) a block copolymer containing at least one block mainly composed of an aromatic vinyl monomer unit and at least one block mainly composed of a conjugated diene monomer unit and/or a hydrogenated product of the block copolymer.

Here, the sum of the contents of the (A-a) component and the (A-b) component with respect to 100 parts by mass of the (A) matrix resin is 75 parts by mass or more. The average L/D of the (B) component is 1.2 or more and 6.0 or less, and the content of titanium dioxide having an L/D of greater than 7.0 is less than 10%.

[(A) Matrix Resin]

The above (A) matrix resin refers to a resin component excluding an inorganic filler, etc. Examples of such a resin component include various resins used for molding, such as polyphenylene ether-based resins, polyester-based resins, polyamide-based resins, polycarbonate-based resins, vinyl-based resins, olefin-based resins, acrylic resins, polyphenylene sulfide, and aromatic resins.

The above (A) matrix resin includes (A-a) a polyphenylene ether-based resin.

The above (A) matrix resin can also include resin components primarily for improving the impact resistance, such as olefinic thermoplastic elastomers and hydrogenated block copolymers.

Examples of the above olefinic thermoplastic elastomers include polyolefin homopolymers such as polyethylene and polypropylene, and polyolefin copolymers such as ethylene-propylene copolymer, ethylene-butylene copolymer, and ethylene-octene copolymer. In particular, high-pressure low-density polyethylene (LDPE), linear low-density polyethylene (LLDPE), and high-density polyethylene (HDPE) are examples of polyethylene homopolymers.

In addition, examples of the above hydrogenated block copolymers include hydrogenated block copolymers obtained by hydrogenating block copolymers consisting of a polystyrene block and a conjugated diene compound polymer block.

The structure of the block copolymer before hydrogenation is not particularly limited. For example, the structures S-B-S, SB-S-B, (S-B-)$_4$-S, S-B-S-B-S, and other structures are used where S represents a polystyrene block chain and B represents a conjugated diene compound polymer block chain.

Furthermore, organic compounds used as additives, such as maleic anhydride or phenolic stabilizers, can also be included in the (A) matrix resin as resin components.

[(A-a) Polyphenylene Ether-Based Resin]

Specific examples of the (A-a) polyphenylene ether-based resin (hereinafter, simply referred to as "(A-a) component" include poly (2,6-dimethyl-1,4-phenylene ether), poly (2-methyl-6-ethyl-1,4-phenylene ether), poly (2-methyl-6-phenyl-1,4-phenylene ether), poly (2,6-dichloro-1,4-phenylene ether), and polyphenylene ether copolymers such as a copolymer of 2,6-dimethylphenol and other phenols (for example, a copolymer with 2,3,6-trimethylphenol or a copolymer with 2-methyl-6-butylphenol as described in JP S52-17880 B).

Among these, particularly preferred polyphenylene ethers are poly (2,6-dimethyl-1,4-phenylene ether), a copolymer of 2,6-dimethylphenol and 2,3,6-trimethylphenol, or a mixture of these.

The above (A-a) component may, for example, be a homopolymer composed of a repeating unit structure represented by the following formula (1) or a copolymer including a repeating unit structure represented by the following formula (1).

The (A-a) component may be used alone or in a combination of two or more.

[Chem. 1]

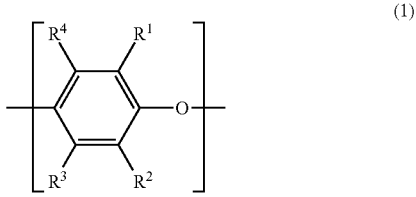

(1)

In formula (1), $R^1$, $R^2$, $R^3$, and $R^4$ are each, independently of one another, a monovalent group selected from the group consisting of a hydrogen atom, a halogen atom, a primary alkyl group having a carbon number of 1 to 7, a secondary alkyl group having a carbon number of 1 to 7, a phenyl group, a haloalkyl group, an aminoalkyl group, a hydrocarbonoxy group, and a halohydrocarbonoxy group in which a halogen atom and an oxygen atom are separated by at least two carbon atoms.

Specific examples of the production methods of the (A-a) polyphenylene ether-based resin are not limited as long as the method can be achieved by any of known methods. Examples include a method described in U.S. Pat. No. 3,306,874 A in which a polyphenylene ether is produced through oxidative polymerization of 2,6-xylenol, for example, using a complex of a cuprous salt and an amine as a catalyst, and methods described in U.S. Pat. Nos. 3,306,875 A, 3,257,357 A, 3,257,358 A, JP S A, JP S52-17880 B, and JP S 63-152628 A.

The reduced viscosity (measured with 0.5-g/dL chloroform solution at 30° C. using an Ubbelohde-type viscometer) of the above (A-a) polyphenylene ether-based resin is preferably 0.30 to 0.80 dL/g, more preferably 0.35 to 0.75 dL/g, and most preferably 0.38 to 0.55 dL/g. When the reduced viscosity of the (A-a) polyphenylene ether-based resin is within this range, excellent properties such as impact resistance and heat resistance can be obtained, which is preferable.

Note that a blend of two or more polyphenylene ether-based resins having different reduced viscosities can also preferably be used in the (A-a) polyphenylene ether-based resin.

Further, various known stabilizers can also be preferably used to stabilize the (A-a) polyphenylene ether-based resin. Examples of the stabilizer include metal-based stabilizers such as zinc oxide and zinc sulfide, and organic stabilizers such as hindered phenol-based stabilizers, phosphorus-based stabilizers, and hindered amine-based stabilizers. These stabilizers are preferably blended in an amount of less than 5 parts by mass with respect to 100 parts by mass of the (A-a) polyphenylene ether-based resin.

Furthermore, a known additive or the like, which can be added to the (A-a) polyphenylene ether-based resin, may also be added in an amount of less than 10 parts by mass with respect to 100 parts by mass of the (A-a) polyphenylene ether-based resin.

The (A-a) component may be modified polyphenylene ether that is obtained by reacting a styrene-based monomer or derivative thereof and/or an α,β-unsaturated carboxylic acid or derivative thereof with a homopolymer and/or copolymer such as described above. Here, the grafted amount or added amount of the styrene-based monomer or derivative thereof and/or the α,β-unsaturated carboxylic acid or derivative thereof is preferably 0.01 to 10% by mass with respect to 100% by mass of the (A-a) component.

The method by which the modified polyphenylene ether is produced may, for example, be a method in which a reaction is carried out under a temperature of 80 to 350° C. in a molten state, solution state, or slurry state, and in the presence or absence of a radical precursor.

The polyphenylene ether that is used may be a mixture of a homopolymer and/or copolymer such as described above and modified PPE such as described above in any ratio.

From the viewpoint of allowing for control on the dielectric constant while maintaining the heat resistance and a low dielectric dissipation factor, the content of the above (A-a) polyphenylene ether-based resin with respect to 100 parts by mass of the above (A) matrix resin is preferably 50 parts by mass or more, more preferably 55 parts by mass or more, and even more preferably 60 parts by mass or more. From the viewpoint of the moldability, it is preferably 85 parts by mass or less.

[(A-b) Block Copolymer Containing at Least One Block Mainly Composed of Aromatic Vinyl Monomer Unit and at Least One Block Mainly Composed of Conjugated Diene Monomer Unit, and/or Hydrogenated Product of the Block Copolymer]

In the present embodiment, (A-b) a block copolymer containing at least one block mainly composed of an aromatic vinyl monomer unit and at least one block mainly composed of a conjugated diene monomer unit and/or a hydrogenated product of the block copolymer (hereinafter, simply referred to as "(A-b) component") may be further included, and is preferably included. The above (A-b) block copolymer containing at least one block mainly composed of an aromatic vinyl monomer unit and at least one block mainly composed of a conjugated diene monomer unit and/or the hydrogenated product of the block copolymer refers to a non-hydrogenated block copolymer containing at least one aromatic vinyl polymer block mainly composed of an aromatic vinyl monomer unit and at least one conjugated diene polymer block mainly composed of a conjugated diene monomer unit, and/or a hydrogenated product of the block copolymer.

With regard to the aromatic vinyl polymer block described above, "mainly composed of an aromatic vinyl monomer unit" refers to the amount of the aromatic vinyl monomer unit being 50% by mass or more in the block. The amount of the aromatic vinyl monomer unit is more preferably 70% by mass or more, more preferably 80% by mass or more, and most preferably 90% by mass or more.

The same applies to "mainly composed of a conjugated diene monomer unit" with regard to the above conjugated diene polymer block, which refers to the amount of the conjugated diene monomer unit being 50% by mass or more in the block. The amount of the conjugated diene monomer unit is more preferably 70% by mass or more, more preferably 80% by mass or more, and most preferably 90% by mass or more.

Furthermore, the above aromatic vinyl polymer block may be, for example, a copolymer block in which a small amount of a conjugated diene compound is randomly bonded in the aromatic vinyl polymer block. Similarly, in the case of the above conjugated diene polymer block, it may be, for example, a copolymer block in which a small amount of an aromatic vinyl compound is bonded randomly in the conjugated diene polymer block.

The aromatic vinyl compound used to form the aromatic vinyl monomer unit is not particularly limited, and examples include styrene, α-methylstyrene, and vinyltoluene, for example. One or more compounds selected from these are used, of which styrene is particularly preferred.

The conjugated diene compound used to form conjugated diene polymer block is not particularly limited, and examples include, butadiene, isoprene, piperylene, and 1,3-pentadiene, for example. One or more compounds selected from these are used, of which butadiene, isoprene, and combinations of these are preferred.

The microstructure of the conjugated diene polymer block portion of the above block copolymer has a 1,2-vinyl amount or a sum of the 1,2-vinyl amount and the 3,4-vinyl amount (total vinyl bond amount) of preferably 5 to 80%, more preferably 10 to 70%.

Note that the total vinyl bond amount can be measured by using an infrared spectrophotometer.

The non-hydrogenated block copolymer used in production of a hydrogenated product of the above block copolymer (hydrogenated block copolymer) is preferably a block copolymer having a bonding form of the aromatic vinyl polymer block (A) and the conjugated diene polymer block (B) selected from an A-B type, an A-B-A type, and an A-B-A-B type. Of these, block copolymers with different bonding forms may be used in combination. Among these, possession of a bonding form selected from A-B-A and an A-B-A-B types is more preferred, and a bonding form having an A-B-A type is even more preferred.

Furthermore, the (A-b) component used in the present embodiment is preferably a partially hydrogenated block copolymer (partially hydrogenated block copolymer).

A partially hydrogenated block copolymer is one which is controlled so that the ratio of aliphatic double bonds in conjugated diene polymer blocks is in the range of more than 0% to less than 100% through hydrogenation of the non-hydrogenated block copolymer described above. The preferred hydrogenation ratio of the partially hydrogenated block copolymer is 50% or more and less than 100%, more preferably 80% or more and less than 100%, and most preferably 98% or more and less than 100%.

Furthermore, the above (A-b) component preferably has a number average molecular weight of 30,000 or more and less than 300,000. When it is in the above range, a composition having excellent fluidity, impact strength, and flame retardance can be obtained.

The evaluation method for the number average molecular weight of the (A-b) component in the resin composition will be described below. Specifically, the (A-b) component is isolated using a solvent that has good solubility for the (A-b) component but has poor solubility for the (A-a) polyphenylene ether-based resin, such as chloroform, for example. The resultant is measured using a gel permeation chromatography measurement apparatus [GPC SYSTEM 21: manufactured by Showa Denko K. K.] with an ultraviolet spectroscopic detector [UV-41: manufactured by Showa Denko K. K.], and the number average molecular weight on the basis of standard polystyrene is determined.

Note that the measurement conditions may be as follows: [solvent: chloroform, temperature: 40° C., columns: sample side (K-G, K-800RL, and K-800R), reference side (two K-805L columns, flow rate: 10 mL/min, measurement wavelength: 254 nm, and pressure: 15 to 17 kg/cm$^2$)].

Low molecular weight components due to catalyst deactivation during polymerization may be detected during a measurement of the number average molecular weight. In such a case, the low molecular weight components are not included in the calculation of the molecular weight. The term low molecular weight components refer to components having a molecular weight of 3000 or less. Normally, a correct molecular weight distribution (mass average molecular weight/number average molecular weight) that is calculated is in the range of 1.0 to 1.1.

These block copolymers as the (A-b) component that can be used in the present embodiment may be, unless otherwise contrary to the purpose of the present embodiment, a mixture of two or more of those with different bonding forms, those with different aromatic vinyl compound types, those with different conjugated diene compound types, those with different 1,2-bond vinyl amount or 1,2-bond vinyl amount and 3,4-bond vinyl amount, those with different content of aromatic vinyl compound components, and those with different hydrogenation rates.

These block copolymers as the (A-b) component that can be used in the present embodiment can also be block copolymers that have been modified entirely or partially.

As used herein, the modified block copolymer refers to a block copolymer that is modified with at least one modifying compound having in the molecular structure at least one carbon-carbon double or triple bond and at least one carboxylic acid group, acid anhydride group, amino group, hydroxyl group, or glycidyl group.

Methods of producing the modified block copolymer include, for example, in the presence or absence of a radical initiator, (1) melting and kneading a block copolymer with a modifying compound in a temperature range from the softening point of the block copolymer or higher to 250° C. or lower to react with a modifying compound, (2) reacting a block copolymer with a modifying compound in a solution at or below the softening point of the block copolymer, and (3) reacting a block copolymer with a modifying compound at or below the softening point of the block copolymer without melting the block copolymer and the modifying compound. Any of these may be used, but preferred is the method (1), and most preferred is the method (1) when performed in the presence of a radical initiator.

As used therein, examples of at least one modifying compound having in the molecular structure at least one carbon-carbon double or triple bond and at least one carboxylic acid group, acid anhydride group, amino group, hydroxyl group, or glycidyl group are the same as modified products described above for the modified polyphenylene ether.

The preferred content of the above (A-b) component is 1 to 40 parts by mass, more preferably 2 to 35 parts by mass, and even more preferably 2 to 30 parts by mass, when the amount of the (A-a) polyphenylene ether-based resin is taken to be 100 parts by mass.

In the present embodiment, from the viewpoint of allowing for control on the dielectric constant while maintaining the dielectric dissipation factor low, the sum of the contents of the above (A-a) polyphenylene ether-based resin and the above (A-b) component with respect to 100 parts by mass of the above (A) matrix resin is 75 parts by mass or more, preferably 80 parts by mass or more, and 85 parts by mass or more.

[(a-2) Polystyrene-Based Resin]

The (A) matrix resin of the present embodiment may include polystyrene-based resin. Examples of the polystyrene-based resin include an atactic polystyrene, a rubber-reinforced polystyrene (high impact polystyrene, HIPS), a styrene-acrylonitrile copolymer (SAN) having a styrene content of 50% by weight or more, and an ABS resin in which such a styrene-acrylonitrile copolymer is reinforced with a rubber, and the atactic polystyrene and/or the high impact polystyrene are preferable.

These polystyrene-based resins may be used alone or in a combination of two or more thereof.

The preferred content of the (A-c) polystyrene-based resin in the present embodiment is 0 to 100 parts by mass, more preferably 0 to 90 parts by mass, and more preferably 0 to 80 parts by mass when the content of the (A-a) polyphenylene ether-based resin is taken to be 100 parts by mass.

[Other Resin Components]

Examples of other resin components in the (A) matrix resin of the present embodiment include polyester, polyolefin such as polypropylene, polyamide, and polyphenylene sulfide.

The specific amount of each of these resin components added is preferably 15% by mass or less, more preferably 13% by mass or less, and even more preferably 10% by mass or less, when the amount of the entire resin composition is taken to be 100% by mass.

The amount of other resin components added as a whole is preferably 30% by mass or less, more preferably 25% by mass, and even more preferably 20% by mass or less, when the entire resin composition is taken to be 100% by mass.

In particular, from the viewpoint of allowing for control on the dielectric constant while maintaining the dielectric dissipation factor low, the sum of the contents of polyamide and polyphenylene sulfide with respect to 100 parts by mass of the (A) matrix resin is preferably parts or less, more preferably 5 parts or less, even more preferably 1 part or less, and may be 0 parts by mass. At least one of polyamide and polyphenylene sulfide may be included, but it is preferable that both polyamide and polyphenylene sulfide are included.

[(b) Titanium Dioxide]

The resin composition of the present embodiment has an excellent dielectric properties because of inclusion of titanium dioxide with a specific shape.

Titanium dioxide which is generally used as a pigment in resins or paints can be divided into two types according to its crystal form: rutile type and anatase type, both of which can be used, but the rutile type is preferred from the viewpoint of the dielectric properties.

In the present embodiment, from the viewpoint of control on the dielectric constant and a low dielectric dissipation factor, the average L/D of the (B) titanium dioxide in the resin composition is 1.2 or more and 6.0 or less. Particularly, the average L/D is preferably 1.3 or more and 5.5 or less, and the average L/D is further preferably 1.5 or more and 5.5 or less, and is more preferably 2.0 or more and 4.5 or less.

When the average L/D of the (B) titanium dioxide in the resin composition is 1.2 or more, the dielectric constant tends to be increased through addition of a small amount of titanium dioxide and the molding processability tends to become better. Furthermore, when the average L/D of the (B) titanium dioxide in the resin composition is 6.0 or less, the dielectric constant tends to be increased while the dielectric dissipation factor is maintained low.

Not that in the present specification the average L/D of titanium dioxide in the resin composition can be determined by the following method. For example, the resin composition is incinerated in a constant-temperature high-temperature electric furnace, etc., to make only the resin component to be combusted. The remaining titanium dioxide is then observed under a scanning electron microscope, and the longest and the shortest diameters of 100 titanium dioxide particles are measured to determine the average L/D. Specifically, it can be measured by the method disclosed in the Examples section.

From the viewpoint of maintaining the dielectric dissipation factor low, it is preferable to adjust the content of titanium dioxide having an excessively large L/D to be low, which leads to provision of excellent performance as an antenna. Specifically, the content of titanium dioxide with an L/D of greater than 7.0 is preferably less than 10% with respect to the entire titanium dioxide (100%) in the above resin composition. The preferred content of titanium dioxide with an L/D of greater than 7.0 is less than 8%, more preferably less than 5%.

The average L/D of titanium dioxide can be adjusted by adjusting the L/D of fibrous titanium dioxide serving as the raw material, or by combining fibrous titanium dioxide and particulate titanium dioxide. It can also be adjusted by kneading conditions, and can be adjusted by changing the location to feed the raw material into a twin-screw kneader or by changing the screw pattern of the kneader. Specifically, the average L/D of titanium dioxide can be reduced under conditions where the titanium dioxide is subjected to a share during kneading, such as setting the feeding location of the raw material to be on the upstream side or by using a screw pattern that provides more intense kneading.

In addition, the titanium dioxide used as a raw material of the resin composition (hereinafter referred to as "raw material titanium dioxide") can be, for example, a known fibrous titanium dioxide with an average fiber diameter of 0.2 to 1.0 μm and an average fiber length of 1 to 6 μm. Furthermore, for the purpose of adjusting the average L/D, fibrous titanium dioxide and particulate titanium dioxide can be used in combination.

As the raw material titanium dioxide above, fibrous titanium dioxide with an average fiber diameter of 0.2 to 0.8 μm and an average fiber length of 2 to 5 μm is preferred, and rutile-type fibrous titanium dioxide is more preferred.

When the average fiber diameter of the raw material titanium dioxide is 0.2 μm or more, occurrence of rat holes in an addition hopper in a conventional single screw kneader or twin screw kneader or backflow of accompanying air or nitrogen at the feed port of the extruder is prevented, which enables stable addition and enables provision of a uniform resin composition through melt kneading, and tends to improve the productivity without lowering the discharge volume. Furthermore, because the specific surface area is reduced, degradation of the resin material tends to be prevented.

When the average fiber diameter of the raw material titanium dioxide is 0.8 μm or less, blocking can be prevented, a stable supply of the raw material titanium dioxide can be achieved, and the resin composition tends to be made more uniform through melt kneading. In addition, the productivity tends to be improved without causing decrease in the discharge amount in a conventional single screw kneader or twin screw kneaders.

The surface of titanium dioxide may also be pre-treated with an inorganic or organic treatment agent to improve dispersion during production of titanium dioxide and dispersion in the resin composition.

Alumina, zirconia, silica, and mixtures thereof are used as the inorganic treatment agent. Because silica is highly water absorbent, it is susceptible to affected by moisture when used in a resin composition, for examples, which leads to decomposition of the resin component and poor appearance of molded products, etc. Therefore, alumina and zirconia are preferable for the inorganic treatment, and a small amount of silica is preferably used when silica is used in combination with alumina. The amount of these inorganic treatment agents used can be selected and determined as needed, but is usually 2 to 10% by mass of titanium dioxide with respect to 100% by mass of titanium dioxide. If the content of the inorganic treatment agent is too high with respect to the amount of titanium dioxide, adsorbed water in the inorganic treatment layer on the surface of titanium dioxide may cause problems such as reduction in the strength and poor appearance of resin molded products produced by molding the resin composition. Conversely, if the amount is too small, improvement effects may become insufficient, for example, the dispersibility becomes insufficient.

Examples of the organic treatment agent include organosilane or organo silicone compounds having an alkoxy group, an epoxy group, an amino groups, or an Si—H bond. Preferred are organosilicone compounds having an Si—H bond from the viewpoint of the dispersibility in the resin composition and adhesion with the resin component. Hydrogen polysiloxane is particularly preferred. The amount of these organic treatment agents used is usually 0.5 to 5% by weight, preferably 1 to 3% by weight, with respect to 100% by mass of titanium dioxide.

In the case where fibrous titanium dioxide is used as the (B) component of the present embodiment, the content of those treatment agents is preferably 8% by mass or less when the fibrous titanium dioxide is taken to be 100% by mass.

The content of the (B) component in the present embodiment is preferably 10 parts by mass or more and 90 parts by mass or less with respect to 100 parts by mass of the resin composition, from the viewpoint of control on the dielectric constant and the moldability. The content is preferably 10 parts by mass or more and 90 parts by mass or less, 10 parts by mass or more and 85 parts by mass or less, and 15 parts by mass or more and 85 parts by mass or less, with respect to 100 parts by mass of the resin composition.
It is preferably 80 parts by mass or less, more preferably 70 parts by mass or less, and even more preferably 60 parts by mass or less.

From the viewpoint of control on the dielectric constant and the moldability, the mass ratio of the above (B) component with respect to 100 parts by mass of the above (A) component is preferably 20 parts by mass or more and 250 parts by mass or less, more preferably 20 parts by mass or more and 230 parts by mass or less, more preferably 25 parts by mass or more and 200 parts by mass or less, and particularly preferably parts by mass parts by mass or more and 200 parts by mass or less.

[Coloring Agent]

In the present embodiment, a method of coloring the resin composition is not particularly limited, and one or more coloring agents selected from known organic pigments and inorganic pigments can be used.

Examples of the organic pigments include azo pigments such as azo lake pigments, benzimidazolone pigments, diarylide pigments and condensed azo pigments, phthalocyanine pigments such as phthalocyanine blue and phthalocyanine green, condensed polycyclic pigments such as isoindolinone pigments, quinophthalone pigments, quinacridone pigments, perylene pigments, anthraquinone pigments, perinone pigments and dioxazine violet, azine pigments, and carbon black. Among these, the carbon black preferably has a dibutyl phthalate (DBP) absorption amount of less than 250 mL/100 g and more preferably less than 150 mL/100 g and a nitrogen adsorption specific surface area of less than 900 $m^2/g$ and more preferably less than 400 $m^2/g$. When they are in the above ranges, a composition having particularly excellent colorability, mechanical strength, and flame retardance can be obtained.

The DBP absorption amount and the nitrogen adsorption specific surface area as used herein refer to values measured with the methods specified in ASTM D2414 and JIS K6217, respectively.

Examples of the azine pigments include Solvent Black 5 (C.I. 50415, CAS No. 11099-03-9), Solvent Black 7 (C.I. 50415: 1, CAS No. 8005-20-5/101357-15-7), and Acid Black 2 (C.I. 50420, CAS No. 8005-03-6/68510-98-5) in the color index.

Examples of the inorganic pigments include metal oxides other than iron oxide, such as zinc oxide and chromium oxide, and composite metal oxides such as titan yellow, cobalt blue, and ultramarine.

The amount of the coloring agent added is preferably 2% by mass or less for carbon black, 2% by mass or less for azine dyes, and 8% by mass or less for inorganic pigments, when the amount of the entire resin composition is taken to be 100% by mass. The amount is more preferably 1% by mass or less for carbon black, 1% by mass or less for azine dyes, and 5% by mass or less for inorganic pigments.

When the coloring agent is added in the above amounts, it is possible to maintain good balance between impact resistance and mechanical properties. Further, in a case of an application that requires flame retardancy, the coloring agent is preferably added in the above amounts from the viewpoint of flame retardancy.

[Inorganic Filler]

In the present embodiment, in addition to the above-described components, an inorganic filler may be added at any stage as necessary to the extent that the effects of the present embodiment are impaired.

Examples of the inorganic filler include inorganic reinforcing materials in fibrous, granular, plate-like, or needle-like shapes, such as glass fibers, potassium titanate fibers, gypsum fibers, brass fibers, ceramic fibers, boron whisker fibers, mica, talc, silica, calcium carbonate, kaolin, calcined kaolin, wollastonite, zonotolite, apatite, glass beads, glass flakes, and titanium oxide. Two or more of these inorganic fillers can be used in combination. Of these, more preferred inorganic fillers are glass fibers, carbon fibers, and glass beads. Inorganic fillers that have been surface treated in a known manner using a surface treatment agent such as a silane coupling agents may also be used. However, because natural ore-based fillers often contain trace amounts of iron elements, it is necessary to select and use fillers that have been purified to remove iron elements.

The specific amount of each of these inorganic fillers added is preferably 15% by mass or less, more preferably 13% by mass or less, and even more preferably 10% by mass or less, when the amount of the entire resin composition is taken to be 100% by mass.

The preferred amount of inorganic fillers added as a whole is preferably 30% by mass or less, more preferably 25% by mass or less, and even more preferably 20% or less, when the entire resin composition is taken to be 100% by mass.

[Other Components]

In addition to the above-mentioned components, the resin composition of the present embodiment may contain, as other additive components, plasticizers (such as low-molecular weight polyolefin, polyethylene glycol, and fatty acid esters), antistatic agents, nucleating agents, fluidity improvers, reinforcing agents, various peroxides, spreading agents, copper-based heat stabilizers, organic heat stabilizers typified by hindered phenol-based oxidative deterioration inhibitors, antioxidants, ultraviolet absorbers, light stabilizers, lubricants such as ethylene bisstearate amide, and denaturants such as maleic anhydride.

The specific amount of each of these components added is preferably 15% by mass or less, more preferably 13% by mass or less, and even more preferably 10% by mass or less, when the amount of the entire resin composition is taken to be 100% by mass.

The preferred amount of other components added as a whole is preferably 30% by mass or less, more preferably 25% by mass or less, and even more preferably 20% or less, when the entire resin composition is taken to be 100% by mass.

The following describes the properties of the resin composition of the present embodiment.

With regards to the deflection temperature under load (DTUL) (° C.) of the resin composition of the present embodiment, a larger value indicates improvement in the heat resistance and is thus preferable.

Note that the deflection temperature under load (DTUL) refers to a value measured by the methods that will be described in EXAMPLES to be described later.

Heat generation by antenna components for high-frequency applications is high, and the heat generation increases with an increase in the frequency. Thus, a resin with a high heat resistance is demanded. Especially for antenna components for frequencies of 1 GHz or more, the resin composition preferably has a DTUL of 100° C. or higher is preferable and a higher heat resistance is more preferred. A resin composition with a DTUL of 110° C. or higher is preferred for antenna components for frequencies of 3 GHz or more, and a resin composition with a DTUL of 120° C. or higher is preferred for antenna components for frequencies of 4 GHz or more.

A smaller value of the dielectric dissipation factor of the resin composition of the present embodiment indicates a reduced energy loss rate and is thus preferred.

As used therein, the dielectric dissipation factor refers to a value measured by the method that will be described in EXAMPLES described later.

In the resin composition of the present embodiment, from the viewpoint of facilitating control on the dielectric constant while maintaining the dielectric dissipation factor low, the ratio of the dielectric constant to the dielectric dissipation factor (dielectric constant/dielectric dissipation factor) at a measurement frequency of 1 GHz is preferably 1500 or more, more preferably 2000 or more, and even more preferably 2250 or more. The upper limit of the dielectric constant/dielectric dissipation factor described above is not limited, but may be 10000, may be 8000, may be 5000, or may be 4000.

From the viewpoint of facilitating control on the dielectric constant while maintaining molding processability, the resin composition of the present embodiment preferably satisfies the relationship $y>0.0006x^2+0.021x+2.52$, more preferably satisfies the relationship $y>0.00065x^2+0.026x+2.52$ and even more preferably satisfies the relationship $y>0.0007x^2+0.031x+2.52$, between the mass ratio x (% by mass) of inorganic substances with respect to 100% by mass of the resin composition and the dielectric constant y of the resin composition at the measured frequency 1 GHz. Although there is no limitation, the relationship between the mass ratio x (% by mass) of inorganic substances with respect to 100% by mass of the resin composition and the dielectric constant y of the resin composition at a measurement frequency of 1 GHz can satisfy any of the following: $y<0.0060x^2+0.105x+2.52$, $y<0.0045x^2+0.092x+2.52$, and $y<0.0030x^2+0.080x+2.52$.

As used herein, the term "inorganic substances" refers to all inorganic substances contained in the resin composition and shall include the (B) titanium dioxide. Examples of inorganic substances other than titanium dioxide include, but are not limited to, the inorganic fillers mentioned above, and a metal stabilizer and an inorganic pigment in the (A-a) polyphenylene ether-based resin. The term "mass ratio of inorganic substances" refers to the percentage of the total mass of all inorganic substances contained in the resin composition.

In the present embodiment, the sum of the contents of the (A-a) polyphenylene ether-based resin, and the (A-b) block copolymer containing at least one block mainly composed of an aromatic vinyl monomer unit and at least one block mainly composed of a conjugated diene monomer unit and/or the hydrogenated product of the block copolymer with respect to 100 parts by mass of the (A) matrix resin is 75 parts by mass or more. It has been confirmed by experiments that this limitation of the composition of the matrix resin achieves a substantially constant dielectric constant of the resin component, and the mass ratio x of inorganic substances and the dielectric constant have a quadratic functional relationship. Therefore, the above relationship represents the effect of dielectric constant improvement per mass ratio x. Increasing the content of titanium dioxide with respect to the inorganic substances tends to help to satisfy the above relationship, and increasing the average L/D of titanium dioxide tends to help to satisfy the above relationship. From these viewpoints, it is preferable that the content of titanium dioxide with respect to 100% by mass of inorganic substances is preferably 50% by mass or more, more preferably 60% by mass or more, even more preferably 70% by mass or more, and may be 100% by mass. Further, as mentioned above, the average L/D of titanium dioxide is 1.2 or more, preferably 1.3 or more, more preferably 1.5 or more, and even more preferably 2.0 or more. However, as mentioned above, the average L/D of titanium dioxide is preferably 6.0 or less because the dielectric dissipation factor tends to increase when titanium dioxide having an excessively high L/D is used.

One method for measuring the mass ratio x of inorganic substances in the resin composition from a molded product is to place the molded product in an electric furnace, incinerate the organic materials contained, measure the mass of the inorganic substances from the resulting residue, and calculate x.

(Method of Producing Resin Composition)

The resin composition of the present embodiment can be produced by melt-kneading the components constituting the (A) component, the raw material titanium dioxide, and, as necessary, the coloring agent, the organic filler, and other components.

Examples of melt-kneaders that can be used to perform the melt-kneading include, but are not limited to, machines that perform heated melt-kneading through a single screw extruder, a multi-screw extruder such as a twin screw extruder, a roll, a kneader, a Brabender Plastograph, a Banbury mixer, or the like. In particular, a twin screw extruder is preferable from a viewpoint of kneadability. Specific examples include the ZSK series produced by Werner & Pfleiderer, the TEM series produced by Toshiba Machine Co., Ltd., and the TEX series produced by The Japan Steel Works, Ltd.

In this process, the melting and kneading temperature that, in the case of a crystalline resin, is at least the melting point of the crystalline resin and, in the case of an amorphous resin, is at least the glass transition temperature of the non-crystalline resin, may be selected such as to enable melt-kneading and processing without difficulty. Normally, the melt-kneading temperature can be arbitrary selected from 200° C. to 370° C.

The following describes a preferable production method using an extruder.

The L/D (effective barrel length/barrel internal diameter) of the extruder is preferably 20 or more and 60 or less, and more preferably 30 or more and 50 or less.

Although no specific limitations are placed on the configuration of the extruder, the extruder preferably includes a first raw material feeding inlet at an upstream side relative to the direction of raw material flow, a first vacuum vent downstream to the first raw material feeding inlet, a second raw material feeding inlet downstream to the first vacuum vent (and also third and fourth raw material feeding inlets downstream to the second raw material feeding inlet as necessary), and a second vacuum vent further downstream to the second raw material feeding inlet. In particular, more preferred is an extruder provided with a kneading section upstream to the first vacuum vent, a kneading section between the first vacuum vent and the second material feeding inlet, and a kneading section between the second to fourth material feeding inlets and the second vacuum vent.

Although no specific limitations are placed on the method by which raw materials are fed at the second to fourth raw material feeding inlets, it is preferable to adopt a method in which raw materials are fed from a side opening of the extruder using a forced side feeder because this tends to enable more stable feeding than when raw materials are simply added through an opening at the second to fourth raw material feeding inlets of the extruder.

In particular, in a situation in which a powder is included among the raw materials and it is desirable to reduce production of crosslinked products or carbides due to resin heat history, a method in which a forced side feeder is used for feeding from the side of the extruder is more preferable, and a method in which forced side feeders are provided at the second to fourth raw material feeding inlets so that the raw material powders are fed in portions is even more preferable.

Moreover, in a situation in which a liquid raw material is to be added, it is preferable to adopt a method of addition into the extruder using a plunger pump, a gear pump, or the like.

Furthermore, upper openings in the extruder at the second to fourth raw material feeding inlets may be used as openings for removing accompanying air.

No specific limitations are placed on the melt-kneading temperature and the screw rotation speed in a process of melt-kneading the resin composition. A temperature that, in the case of a crystalline resin, is at least the melting point of the crystalline resin and, in the case of an amorphous resin, is at least the glass transition temperature of the non-crystalline resin, may be selected such as to enable melt-kneading and processing without difficulty. Normally, the melt-kneading temperature can be arbitrary selected from 200° C. to 370° C., and the screw rotation speed can be 100 rpm to 1,200 rpm.

In one specific aspect of the production method of the resin composition of the present embodiment using a twin screw extruder, for example, the components constituting the (A) component and the raw material titanium dioxide are fed to the first material feeding inlet of the twin screw extruder, the heating and melting zone is set to the melting temperature of the thermoplastic resin, and melt-kneading is carried out at a screw rotation speed between 100 and 1200 rpm, preferably between 200 and 500 rpm. The components constituting the (A) component and the raw material titanium dioxide may be fed to the twin screw extruder in batch from the first material feeding inlet of the extruder as described above. Alternatively, the second material feeding inlet, the third material feeding inlet, and the fourth material feeding inlet may be provided so that the raw materials may be fed in portions.

In a situation in which production of crosslinked products or carbides due to resin heat history in the presence of oxygen is to be reduced, the oxygen concentration in individual process lines of addition paths for raw materials into the extruder is preferably maintained at less than 1.0% by volume. Although these addition paths are not specifically limited, in one specific example of configuration, an addition path comprises, in this order, piping leading from a stock tank, a gravimetric feeder having a refill tank, piping, a feed hopper, and the twin screw extruder. The method by which a low oxygen concentration is maintained is not specifically limited, but a method of introducing an inert gas into individual process lines having increased air tightness is an effective method. In general, it is preferable that nitrogen gas is introduced into the process lines to maintain an oxygen concentration of less than 1.0% by volume.

In a situation in which the thermoplastic resin of the (A) component includes a component that is in the form of a powder (volume average particle diameter of less than 10 μm), the resin composition production method described above has an effect of reducing residual matter in screws of a twin screw extruder during production of the resin composition of the present embodiment using the twin screw extruder, and also has an effect of reducing generation of black spot foreign matter, carbides, and the like in the resultant resin composition obtained by the production method described above.

More specifically, production of the resin composition of the present embodiment is preferably implemented by any of the following methods 1 to 3 using an extruder in which the oxygen concentration of each raw material feeding inlet is controlled to less than 1.0% by volume.

1. A production method involving melt-kneading the entire amount of the components constituting the (A) component to be contained in the resin composition of the present embodiment (first kneading step); and feeding the entire amount of the raw material titanium dioxide to the molten kneaded product that is obtained through the first kneading step, followed by further melt-kneading (second kneading step).

2. A production method involving melt-kneading the entire amount of the components constituting the (A) component and a part of titanium dioxide to be contained in the resin composition of the present embodiment (first kneading step), feeding the remainder of titanium dioxide to the molten kneaded product that is obtained through the first kneading step, followed by further kneading (second kneading step).

3. A production method involving melt-kneading all of the components to be contained in the resin composition of the present embodiment.

In particular, because some thermoplastic resins such as the (A-a) polyphenylene ether-based resin contained in the (A) component and the raw material titanium dioxide are powdery and have poor biteability to the extruder, increasing the production rate per hour is difficult. Moreover, thermal degradation of resin tends to occur due to the long residence time of the resin in the extruder. In the production method 1 or 2 described above, the biteability of titanium dioxide is improved, each component is favorably mixed, decomposition caused by thermal degradation and generation of cross-linked substances and carbonized materials can be reduced, the production rate per hour of resin can be increased, and a resin composition having an excellent productivity and quality can be obtained. In view of the above, a resin composition obtained by the production method 1 or 2 is more preferred compared to a resin composition obtained by the production method 3.

[Molded Product and Component for Telecommunication Apparatus]

A molded product of the present embodiment is made of the resin composition described above. The method of producing the molded product of the present embodiment is not limited, but the molded product can be made by injection molding, for example.

Further, a mode may also be used in which a coating layer made of a paint, a metal, or a different polymer may be formed on the surface of a molded product produced by such a method.

The component for a telecommunication apparatus of the present embodiment has one or more of the above molded products. The component for a telecommunication apparatus may have a structure in which multiple molded products are mated with each other.

[Circuit Formation on Component for Telecommunication Apparatus]

The component for telecommunication apparatus of the present embodiment may subjected to application of a metal ink or plating and used.

The component for a telecommunication apparatus of the present embodiment may have one or more selected from the group consisting of a metal circuit, metal wiring, and a metal base.

From this viewpoint, a molded product which can be coated with a metal ink is preferably used as the molded product of the present embodiment. Any of gold, silver, and copper may be used in the metal ink. Furthermore, an ink containing multiple metals can be used.

The same is applicable to plating, and any metal can be used.

The present embodiment has a high capability to prevent copper damage and can reduce cracking after application and plating of the above metal ink.

For example, the metal ink can be applied and then adhered to the resin in various ways. Even methods that require heat resistance, such as method by using laser to achieve adhesion, can be used for the component for a telecommunication apparatus of the present embodiment.

For example, the inkjet method can be used to draw and form circuit patterns on a circuit board using a conductive metal paste on the component for a telecommunication apparatus. This circuit patterning method can rely on known methods (see, for example, JP 2002-324966 A).

The conductive metal paste used is a conductive metal paste prepared by uniformly dispersing ultrafine metal particles having a small average particle diameter in a thermosetting resin composition containing an organic solvent. The ultrafine metal particles with small average particle diameters are selected so that the average particle diameters are in the range of 1 to 100 nm. The surfaces of the ultrafine metal particles are suitably coated with one or more compounds having a group containing a nitrogen, oxygen, or sulfur atom as a group capable of coordinatively bonding with the metal element contained in such ultrafine metal particles.

As the fine metal ultrafine particles having a small average particle diameter to be contained in the above conductive metal paste, fine particles consisting of one metal or an alloy consisting of two or more metals selected from the group consisting of gold, silver, copper, platinum, palladium, tungsten, nickel, tantalum, bismuth, lead, indium, tin, zinc, titanium, and aluminum.

The circuit pattern forming method has the steps of spraying or applying the above conductive metal paste as minute droplets onto a substrate to draw a circuit pattern of a coated film of the conductive metal paste, and thermally treating the coated film of the drawn conductive metal paste at a temperature equal to or higher than the thermosetting temperature of the thermosetting resin.

Inkjet drawing methods include thermal drawing methods by generating bubbles by heating and ejecting droplets, and piezoelectric drawing methods by ejecting droplets by compression using a piezoelectric element.

[Dielectric Properties of Component for Telecommunication Apparatus]

The component for a telecommunication apparatus of the present embodiment can be used for applications that require a material with a low dielectric dissipation factor, particularly in high frequency ranges. In such applications, control on the dielectric dissipation factor is an important technology because a large loss will reduce the performances of the component as a component for telecommunication apparatus. The present embodiment can provide a component for a telecommunication apparatus that enables control on the dielectric constant while maintaining the dielectric dissipation factor low.

The component for a telecommunication apparatus of the present embodiment can be suitably used for antennas, receivers, and base stations for telecommunication apparatuses.

EXAMPLES

The following provides a more detailed description of the present disclosure through examples and comparative examples. However, the present disclosure is not limited to the following examples.

The raw materials and the measurement methods used in the examples and the comparative examples are as follows.

[Raw Materials]

(A-a) Polyphenylene ether (hereinafter referred to as PPE)

(A-a-1) Polyphenylene ether resin obtained by oxidative polymerization of 2,6-xylenol The reduced viscosity (measured with 0.5-g/dL chloroform solution at 30° C.) of the polyphenylene ether resin was 0.52 dL/g.

(A-a-2) Polyphenylene ether resin obtained by oxidative polymerization of 2,6-xylenol The reduced viscosity (measured with 0.5-g/dL chloroform solution at 30° C.) of the polyphenylene ether resin was 0.40 dL/g.

(A-a-3) Polyphenylene ether resin obtained by oxidative polymerization of 2,6-xylenol The reduced viscosity (measured with 0.5-g/dL chloroform solution at 30° C.) of the polyphenylene ether resin was 0.32 dL/g.

(B) Titanium Dioxide (B-1) Fibrous titanium dioxide (product name: TIPAQUE® PFR404 manufactured by Ishihara Sangyo Kaisha, Ltd.), average diameter: 0.4 μm, average fiber length: 3 μm, average L/D: 7.5

(B-2) Fibrous titanium dioxide (product name: TIPAQUE® FTL-300 manufactured by Ishihara Sangyo Kaisha, Ltd.), average diameter: 0.4 μm, average fiber length: 5 μm, average L/D: 12.5

(B-3) Fibrous titanium dioxide (product name: TIPAQUE® FTL-400 manufactured by Ishihara Sangyo Kaisha, Ltd.), average diameter: 0.5 μm, average fiber length: 10 μm, average L/D: 20

(B-4) Particulate titanium dioxide (product name Tioxide® RTC-30 manufactured by VENATOR), average particle diameter: 0.2 μm, titanium dioxide content: 94% by mass.

(A-b) Block copolymer containing at least one block mainly composed of an aromatic vinyl monomer unit and at least one block mainly composed of a conjugated diene monomer unit and/or a hydrogenated product of the block copolymer and/or a hydrogenated product of the block copolymer Hydrogenated block copolymer (TUFTEC® H1051 manufactured by Asahi Kasei Corporation)

(A-c) Polystyrene-Based Resin (A-c-1) High impact polystyrene (H9405 manufactured by PS Japan Corporation)

(A-c-2) High impact polystyrene (Product name: "CT-60", manufactured by Petrochemicals Corporation)

(Other Components)

(A-d) Polyamide 6,6 (Hereinafter Referred to as PA66)

In a 5-liter autoclave, 2400 g of an equimolar salt of adipic acid and hexamethylenediamine, 100 g of adipic acid, and 2.5 liters of pure water were charged and stirred sufficiently. After the atmosphere in the autoclave was sufficiently replaced with nitrogen, the temperature was raised from room temperature to 220° C. under stirring for about 1 hour. In this step, the gauge pressure in the autoclave reached 1.76 MPa at natural pressure of water vapor. Subsequently, heating was continued while water was removed from the reaction system such that the pressure is prevented from reaching 1.76 MPa or higher. After another 2 hours, when the internal temperature reached 260° C., the autoclave was depressurized by opening and closing the autoclave valve over about 40 minutes until the internal pressure dropped 0.2 MPa while heating was continued. The reactant was then allowed to cool to room temperature over about 8 hours. After cooling, the autoclave was opened and about 2 kg of a polymer was removed and ground.

The polyamide obtained had an Mw of 38,700 and Mw/Mn of 2.1. Note that Mw and Mn were determined using GPC (mobile layer: hexafluoroisopropanol, standard: PMMA (polymethyl methacrylate)).

The end amino group concentration was measured according to the method for measuring the end amino group concentration described in EXAMPLES in JP H7-228689 A, and was determined to be 38 μmol/g.

(A-e) Polypropylene homopolymer with MFR=2 g/10 min (Other Components)

(C) Ethylenebis stearate amide: "KAO WAX EB-G" manufactured by Kao Corporation (D) Maleic anhydride ("Crystal MAN", manufactured by NOF CORPORATION (E) Calcium carbonate (SL-2200 manufactured by Takehara Kagaku Kogyo Co., Ltd.)

[Evaluation Methods]

Evaluation tests were conducted in examples and comparative examples under the conditions below.

(1) Dielectric Constant and Dielectric Dissipation Factor

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to produce a flat plate of 80 mm×40 mm×1.5 mm. A flat plate was cut out and was measured under the following conditions.

Measurement apparatus: Vector network analyzer HP8510C (Agilent Technologies)

Synthesized sweeper HP83651A (same as above)

Test set HP8517B (same as above)

Dimensions of specimen: 2 mm×4 mm×40 mm

Shape of resonator: Cylinder with a inner diameter of 229 mm and a height of 40 mm Measuring direction: 1 direction Measurement frequency: about 1 GHz (TM010 mode)

Pretreatment: C-90h/22±1° C./60±5% RH

Test environment: 22° C./56% RH

It was determined that a lower dielectric dissipation factor indicated better performance.

(2) Deflection Temperature Under Load (DTUL)

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to prepare an ISO dumbbell for evaluation. In addition, the ISO dumbbell was cut to prepare a measurement test piece for the deflection temperature under load (DTUL). The deflection temperature under load: DTUL (ISO 75: under a load of 1.80 MPa) was measured using the above measurement test piece for deflection temperature under load.

It was determined that a greater value indicated better heat resistance.

(3) Applicability of Copper Oxide Ink

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to produce a flat plate of 90 mm×50 mm×2.5 mm. Then, a copper oxide ink was applied to the plate and a determination was made as to whether or not adhesion was achieve by laser. An evaluation was O when adhesion was accomplished or X when adhesion was not accomplished, and ones with which adhesion was accomplished were determined to be excellent for used in telecommunication apparatuses.

(4) Antenna Performance

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 250 MPa, an injection time of 20 seconds, and a cooling time of 15 seconds to produce a flat plate of 150 mm×150 mm×2.0 mm. A plated copper foil was bonded to the flat plates to form antenna electrodes, and identical antenna devices were produced. The antenna characteristic was evaluated by connecting an antenna gain evaluation device using a network analyzer via a coaxial cable of 50Ω at a distance of 3 m from the antenna for measurement in an electromagnetic anechoic chamber. The evaluation was made as follows: "O" indicative of excellent antenna performance when a specific directivity pattern was obtained, and an "X" indicative of poor antenna performance when the specific directivity pattern was not obtained.

(5) Copper Foil Peel Strength

Produced resin composition pellets were fed into a small-sized injection molding machine (product name: EC75-SXII manufactured by Toshiba Machine Co., Ltd.), of which the cylinder temperature was set to 250 to 350° C., and were molded under conditions of a mold temperature of 70 to 130° C., an injection pressure of 200 MPa, an injection time of 20 seconds, and a cooling time of 15 seconds to produce a flat plate of 90 mm×50 mm×2.5 mm. The top and bottom of the flat plates were sandwiched by copper foil films, and bonding was carried out at 260° C. in a heat press. The copper foil films used were TQ-M7-VSP manufactured by MITSUI MINING & SMELTING CO., LTD. The copper foil peel strength of the bonded copper foil bonded on the flat plate was measured using a tensile tester. Samples with deflection temperature under loads 120° C. or lower were not measured because they could not withstand the processing temperature. It was determined that a higher value of the copper foil peel strength indicated suitability as the material for forming circuits.

(6) Average L/D of (B) Component in Resin Composition

Produced resin composition pellets were weighed to 10 g, which was incinerated in a constant-temperature high-temperature electric furnace (SK-3050F-SP) at 650° C. for 2 hours to make only the resin components to be combusted. The remaining (B) component etc. was then observed under a scanning electron microscope (S-4800 manufactured by Hitachi High-Technologies Corporation). The longest diameter and the shortest diameters of 500 arbitrarily selected titanium dioxide particles in the field of view were measured. The average L/D was obtained from the additive average of the longest diameter and the additive average of the shortest diameter determined.

The L/D of each particle was calculated from the measurement results of the longest diameters and the shortest diameters of the same 500 titanium dioxide particles. An evaluation was made as follows: those having the content of titanium dioxide with an L/D of greater than 7.0 of less than 10% were evaluated as O and those with 10% or more were evaluated as X.

Examples 1 to 16 and Comparative Examples 1 to 5

A resin composition was produced by blending (A) a matrix resin, (B) titanium dioxide, and other components in the compositions summarized in Table 1, using a twin-screw extruder ZSK-40 (manufactured by Coperion Werner & Pfleider, Germany). This twin screw extruder was provided with a first material feeding inlet provided on the upstream to the flow direction of the material, and a first vacuum vent provided downstream to the first material feeding inlet, and a second material feeding inlet provided downstream to the first vacuum vent, and a second vent provided downstream to the second material feeding inlet.

Using the extruder configured as described above, each component was added in the composition and addition method summarized in Tables 1 and 2, and molten and kneaded under the conditions of an extrusion temperature from 250 to 320° C., a screw rotation speed of 300 rpm, and a discharge rate of 100 kg/hour to produce pellets.

The obtained resin composition pellets were used to conduct evaluations mentioned above. Evaluation results are summarized in Table 1.

TABLE 1

|  |  |  |  | Example 1 | Example 2 | Example 3 | Example 4 | Example 5 | Example 6 | Example 7 | Example 8 |
|---|---|---|---|---|---|---|---|---|---|---|---|
| Production method of resin composition | Upstream supply port | Component (A-a-1) | pts. by mass | — | — | 42 | — | — | — | — | — |
|  |  | Component (A-a-2) | pts. by mass | 42 | 47 | — | 52 | 33 | 25 | 25 | 40 |
|  |  | Component (A-a-3) | pts. by mass | — | — | — | — | — | — | — | 10 |
|  |  | Compositions (A-b) | pts. by mass | 12 | 10 | 10 | 12 | 5 | 3 | 3 | 10 |
|  |  | Component (A-c-1) | pts. by mass | — | — | — | — | — | — | — | 8 |
|  |  | Component (A-c-2) | pts. by mass | 6 | — | 8 | 16 | — | — | — | — |
|  |  | Component (A-d) | pts. by mass | — | — | — | — | — | — | — | — |
|  |  | Component (A-e) | pts. by mass | — | — | — | — | — | — | — | — |
|  |  | Component (C) | pts. by mass | — | 0.25 | — | — | — | — | — | — |
|  |  | Component (D) | pts. by mass | — | — | — | — | — | — | — | — |
|  |  | Component (B-1) | pts. by mass | — | — | — | — | — | 35 | 70 | — |
|  | Downstream supply inlet | Component (B-1) | pts. by mass | 40 | 43 | 40 | 20 | 60 | 35 | — | 40 |
|  |  | Component (B-2) | pts. by mass | — | — | — | — | — | — | — | — |
|  |  | Component (B-3) | pts. by mass | — | — | — | — | — | — | — | — |
|  |  | Component (B-4) | pts. by mass | — | — | — | — | — | — | — | — |
|  |  | Component (E) | pts. by mass | — | — | — | — | — | — | — | — |
| Resin composition | Component (A-a) |  | pts. by mass | 42 | 47 | 42 | 52 | 33 | 25 | 25 | 50 |
|  | Compositions (A-b) |  | pts. by mass | 12 | 10 | 10 | 12 | 5 | 3 | 3 | 10 |
|  | Component (A-c) |  | pts. by mass | 6 | 0 | 8 | 16 | 0 | 0 | 0 | 8 |
|  | Component (A-d) |  | pts. by mass | 0 | 0 | 0 | 0 | 0 | 0 | 0 | 0 |
|  | Component (A-e) |  | pts. by mass | 0 | 0 | 0 | 0 | 0 | 0 | 0 | 0 |
|  | Component (C) |  | pts. by mass | 0 | 0.25 | 0 | 0 | 0 | 0 | 0 | 0 |
|  | Component (D) |  | pts. by mass | 0 | 0 | 0 | 0 | 0 | 0 | 0 | 0 |
|  | Component (E) |  | pts. by mass | 0 | 0 | 0 | 0 | 0 | 0 | 0 | 0 |
|  | Component (B) |  | pts. by mass | 40 | 43 | 40 | 20 | 60 | 70 | 70 | 40 |
|  | Component (A) |  | pts. by mass | 60 | 57 | 60 | 80 | 38 | 28 | 28 | 68 |
|  | Components (A-a) + (A-b)/(A) |  | % by mass | 90 | 100 | 87 | 80 | 100 | 100 | 100 | 88 |
| Evaluation | (1-1) Dielectric constant |  | — | 5.2 | 6.0 | 5.2 | 3.8 | 9.5 | 11.0 | 10.8 | 5.1 |
|  | (1-2) Dielectric dissipation factor |  | — | 0.002 | 0.002 | 0.002 | 0.001 | 0.004 | 0.004 | 0.004 | 0.002 |
|  | (2) DTUL |  | ° C. | 153 | 174 | 155 | 141 | 154 | 162 | 160 | 150 |
|  | (3) Applicability of copper oxide ink |  | — | O | O | O | O | O | O | O | O |

TABLE 1-continued

| | | | Example 9 | Example 10 | Example 11 | Example 12 | Example 13 | Example 14 | Example 15 |
|---|---|---|---|---|---|---|---|---|---|
| (4) Antenna characteristic | | — | ○ | ○ | ○ | ○ | ○ | ○ | ○ | ○ |
| (5) Copper foil peel strength | | — | 1.4 | 1.4 | 1.5 | 1.7 | 1.0 | 0.8 | 0.8 | 1.6 |
| (6) Average L/D of Component (B) | | — | 4.3 | 4.1 | 4.3 | 4.4 | 4.1 | 3.9 | 3.6 | 4.5 |
| (6) Content of component exceeding L/D = 7.0 | | — | ○ | ○ | ○ | ○ | ○ | ○ | ○ | ○ |
| Mass ratio x of inorganic substances with respect to 100% by weight of resin composition | | % by mass | 40.0 | 42.9 | 40.0 | 20.0 | 61.2 | 71.4 | 71.4 | 37.0 |
| $0.0006x^2 + 0.021x + 2.52$ | | — | 4.3 | 4.5 | 4.3 | 3.2 | 6.1 | 7.1 | 7.1 | 4.1 |

| | | | | | Example 9 | Example 10 | Example 11 | Example 12 | Example 13 | Example 14 | Example 15 |
|---|---|---|---|---|---|---|---|---|---|---|---|
| Production method of resin composition | Upstream supply port | Component (A-a-1) | | pts. by mass | — | — | 4 | — | 10 | — | — |
| | | Component (A-a-2) | | pts. by mass | 39 | 42 | 40 | 42 | 30 | 10 | 39 |
| | | Component (A-a-3) | | pts. by mass | — | — | — | — | — | 40 | — |
| | | Compositions (A-b) | | pts. by mass | 12 | 12 | 10 | 12 | 10 | 4 | 12 |
| | | Component (A-c-1) | | pts. by mass | — | — | — | — | 8 | 4 | — |
| | | Component (A-c-2) | | pts. by mass | 9 | 6 | 6 | 6 | — | 8 | 9 |
| | | Component (A-d) | | pts. by mass | — | — | — | — | — | — | — |
| | | Component (A-e) | | pts. by mass | — | — | — | — | — | — | — |
| | | Component (C) | | pts. by mass | — | — | 0.5 | — | — | — | — |
| | | Component (D) | | pts. by mass | — | 0.1 | — | — | — | — | — |
| | | Component (B-1) | | pts. by mass | — | — | — | — | — | — | — |
| | Downstream supply inlet | Component (B-1) | | pts. by mass | 20 | 40 | 40 | 30 | 10 | 40 | 20 |
| | | Component (B-2) | | pts. by mass | — | — | — | — | — | — | — |
| | | Component (B-3) | | pts. by mass | — | — | — | — | — | — | — |
| | | Component (B-4) | | pts. by mass | 20 | — | — | 10 | 30 | — | 20 |
| | | Component (E) | | pts. by mass | — | — | — | — | — | — | 20 |
| Resin composition | Component (A-a) | | | pts. by mass | 39 | 42 | 44 | 42 | 40 | 50 | 39 |
| | Compositions (A-b) | | | pts. by mass | 12 | 12 | 10 | 12 | 10 | 4 | 12 |
| | Component (A-c) | | | pts. by mass | 9 | 6 | 6 | 6 | 8 | 12 | 9 |
| | Component (A-d) | | | pts. by mass | 0 | 0 | 0 | 0 | 0 | 0 | 0 |
| | Component (A-e) | | | pts. by mass | 0 | 0 | 0 | 0 | 0 | 0 | 0 |
| | Component (C) | | | pts. by mass | 0 | 0 | 0.5 | 0 | 0 | 0 | 0 |
| | Component (D) | | | pts. by mass | 0 | 0.1 | 0 | 0 | 0 | 0 | 0 |
| | Component (E) | | | pts. by mass | 0 | 0 | 0 | 0 | 0 | 0 | 20 |
| | Component (B) | | | pts. by mass | 40 | 40 | 40 | 40 | 40 | 40 | 20 |
| | Component (A) | | | pts. by mass | 60 | 60 | 60 | 60 | 58 | 66 | 60 |
| | Components (A-a) + (A-b)/(A) | | | % by mass | 85 | 90 | 90 | 90 | 86 | 82 | 85 |
| Evaluation | (1-1) Dielectric constant | | | — | 4.6 | 5.3 | 5.4 | 5.0 | 4.7 | 4.9 | 4.3 |
| | (1-2) Dielectric dissipation factor | | | — | 0.002 | 0.002 | 0.003 | 0.002 | 0.002 | 0.002 | 0.002 |
| | (2) DTUL | | | °C. | 145 | 154 | 154 | 150 | 142 | 140 | 143 |
| | (3) Applicability of copper oxide ink | | | — | ○ | ○ | ○ | ○ | ○ | ○ | ○ |
| | (4) Antenna characteristic | | | — | ○ | ○ | ○ | ○ | ○ | ○ | ○ |
| | (5) Copper foil peel strength | | | — | 1.7 | 1.5 | 1.5 | 1.6 | 1.4 | 1.6 | 1.4 |
| | (6) Average L/D of Component (B) | | | — | 3.2 | 4.4 | 4.2 | 3.8 | 2.6 | 5.1 | 3.1 |
| | (6) Content of component exceeding L/D = 7.0 | | | — | ○ | ○ | ○ | ○ | ○ | ○ | ○ |
| | Mass ratio x of inorganic substances with respect to 100% by weight of resin composition | | | % by mass | 40.0 | 40.0 | 39.8 | 40.0 | 40.8 | 37.7 | 40.0 |
| | $0.0006x^2 + 0.021x + 2.52$ | | | — | 4.3 | 4.3 | 4.3 | 4.3 | 4.4 | 4.2 | 4.3 |

| | | | | | Example 16 | Comp. Example 1 | Comp. Example 2 | Comp. Example 3 | Comp. Example 4 | Comp. Example 5 |
|---|---|---|---|---|---|---|---|---|---|---|
| | Production method of resin composition | Upstream supply port | Component (A-a-1) | pts. by mass | — | — | — | — | — | — |
| | | | Component (A-a-2) | pts. by mass | 39 | 42 | 42 | 30 | — | — |
| | | | Component (A-a-3) | pts. by mass | — | — | — | — | — | — |
| | | | Compositions (A-b) | pts. by mass | 12 | 12 | 12 | 10 | 10 | 10 |
| | | | Component (A-c-1) | pts. by mass | — | — | — | — | — | — |
| | | | Component (A-c-2) | pts. by mass | 9 | 6 | 6 | — | — | — |
| | | | Component (A-d) | pts. by mass | — | — | — | 20 | 50 | — |
| | | | Component (A-e) | pts. by mass | — | — | — | — | — | 50 |
| | | | Component (C) | pts. by mass | — | — | — | — | — | — |
| | | | Component (D) | pts. by mass | — | — | — | 0.5 | 0.5 | — |
| | | | Component (B-1) | pts. by mass | — | — | — | — | — | — |
| | | Downstream supply inlet | Component (B-1) | pts. by mass | 25 | — | — | 40 | 40 | 40 |
| | | | Component (B-2) | pts. by mass | — | 40 | — | — | — | — |
| | | | Component (B-3) | pts. by mass | — | — | 40 | — | — | — |
| | | | Component (B-4) | pts. by mass | — | — | — | — | — | — |
| | | | Component (E) | pts. by mass | 15 | — | — | — | — | — |
| | Resin composition | Component (A-a) | | pts. by mass | 39 | 42 | 42 | 30 | 0 | 0 |
| | | Compositions (A-b) | | pts. by mass | 12 | 12 | 12 | 10 | 10 | 10 |
| | | Component (A-c) | | pts. by mass | 9 | 6 | 6 | 0 | 0 | 0 |
| | | Component (A-d) | | pts. by mass | 0 | 0 | 0 | 20 | 50 | 0 |
| | | Component (A-e) | | pts. by mass | 0 | 0 | 0 | 0 | 0 | 50 |

TABLE 1-continued

|  |  |  |  |  |  |  |  |  |
|---|---|---|---|---|---|---|---|---|
|  | Component (C) | pts. by mass | 0 | 0 | 0 | 0 | 0 | 0 |
|  | Component (D) | pts. by mass | 0 | 0 | 0 | 0.5 | 0.5 | 0 |
|  | Component (E) | pts. by mass | 15 | 0 | 0 | 0.5 | 0.5 | 0 |
|  | Component (B) | pts. by mass | 25 | 40 | 40 | 40 | 40 | 40 |
|  | Component (A) | pts. by mass | 60 | 60 | 60 | 60 | 60 | 60 |
|  | Components (A-a) + (A-b)/(A) | % by mass | 85 | 90 | 90 | 67 | 17 | 17 |
| Evaluation | (1-1) Dielectric constant | — | 4.5 | 10.1 | 10.5 | 6.0 | 6.8 | 4.8 |
|  | (1-2) Dielectric dissipation factor | — | 0.002 | 0.187 | 0.213 | 0.006 | 0.007 | 0.001 |
|  | (2) DTUL | °C. | 145 | 166 | 165 | 120 | 110 | 90 |
|  | (3) Applicability of copper oxide ink | — | ○ | ○ | ○ | ○ | ○ | X |
|  | (4) Antenna characteristic | — | ○ | X | X | X | X | X |
|  | (5) Copper foil peel strength | — | 1.4 | 1.3 | 1.3 | — | — | — |
|  | (6) Average L/D of Component (B) | — | 3.3 | 8.8 | 9.7 | 4.6 | 4.8 | 4.9 |
|  | (6) Content of component exceeding L/D = 7.0 | — | ○ | X | X | ○ | ○ | ○ |
|  | Mass ratio x of inorganic substances with respect to 100% by weight of resin composition | % by mass | 40.0 | 40.0 | 40.0 | 39.8 | 39.8 | 40.0 |
|  | $0.0006x^2 + 0.021x + 2.52$ | — | 4.3 | 4.3 | 4.3 | 4.3 | 4.3 | 4.3 |

INDUSTRIAL APPLICABILITY

The component for a telecommunication apparatus of the present disclosure has industrial applicability; for example, it is suitable for use in antennas, receivers, and base stations for telecommunication apparatuses. It is particularly suitable for use in high frequency ranges, where control on the dielectric constant is required.

The invention claimed is:

1. A component for a telecommunication apparatus, the component comprising a molded product made of a resin composition,
    wherein the resin composition comprises (a) a matrix resin and (b) titanium dioxide,
    the (A) matrix resin comprises (A-a) a polyphenylene ether-based resin,
    a sum of contents of the (A-a) polyphenylene ether-based resin, and (A-b) a block copolymer containing at least one block mainly composed of an aromatic vinyl monomer unit and at least one block mainly composed of a conjugated diene monomer unit and/or a hydrogenated product of the block copolymer with respect to 100 parts by mass of the (A) matrix resin is 75 parts by mass or more, and
    an average L/D of the (B) titanium dioxide is 1.2 or more and 6.0 or less, and a content of titanium dioxide having an L/D of greater than 7.0 is less than 10%.

2. The component for a telecommunication apparatus according to claim 1, wherein the resin composition comprises the (A-b) block copolymer containing at least one block mainly composed of an aromatic vinyl monomer unit and at least one block mainly composed of a conjugated diene monomer unit and/or the hydrogenated product of the block copolymer.

3. The component for a telecommunication apparatus according to claim 1, wherein the resin composition further comprises (A-c) a polystyrene-based resin.

4. The component for a telecommunication apparatus according to claim 1, wherein 10 parts by mass or more and 90 parts by mass or less of the (B) titanium dioxide is contained with respect to 100 parts by mass of the resin composition.

5. The component for a telecommunication apparatus according to claim 1, wherein 50 parts by mass or more of the (A-a) polyphenylene ether-based resin is contained with respect to 100 parts by mass of the (A) matrix resin.

6. The component for a telecommunication apparatus according to claim 1, wherein 10 parts or less of polyamide and polyphenylene sulfide in total are contained with respect to 100 parts by mass of the (A) matrix resin.

7. The component for a telecommunication apparatus according to claim 1, wherein a mass ratio x (% by mass) of inorganic substances with respect to 100% by mass of the resin composition and a dielectric constant y of the resin composition at a measurement frequency of 1 GHz satisfy the relationship: $y>0.0006x^2+0.021x+2.52$.

8. The component for a telecommunication apparatus according to claim 1, wherein the component has a structure in which a plurality of the molded products are mated with each other.

9. The component for a telecommunication apparatus according to claim 1, wherein the component comprises a circuit pattern formed by application of a copper ink.

10. The component for a telecommunication apparatus according to claim 1, further comprising one or more selected from the group consisting of a metal circuit, metal wiring, and a metal base.

11. The component for a telecommunication apparatus according to claim 1, wherein the component is a component for a high frequency antenna.

* * * * *